UNITED STATES PATENT OFFICE 2,492,662

METALATION OF HALOGENATED THIOPHENES

John W. Schick, Camden, and Howard D. Hartough, Pitman, N. J., assignors to Socony-Vacuum Oil Company, Incorporated, a corporation of New York No Drawing. Application December 24, 1946, Serial No. 718,272

17 Claims. (Cl. 260—329)

This invention relates to a method for metalating halogenated thiophenes and to the products obtained as a result of said metalation.

One method of preparing inorganic salts is by the interaction of an acid with a metal. In a similar manner, salts can be prepared from the action of a metal on an organic compound containing one or more acidic hydrogen atoms. Such reactions involving replacement of an acidic hydrogen by a metal atom to yield an organometallic compound illustrate transformations generally referred to as metalation.

In reactions between an organic halide and a highly reactive metal, such as sodium, the halogen atom is ordinarily removed from the organic molecule and replaced either by a sodium atom or by an organic radical. In the latter instance a coupling reaction between two of the organic halide molecules takes place at the halogen linkage with removal of the halogen atoms from each molecule, said halogen atoms combining with metal atoms present to form a salt. Thus, these two general types of reactions may be designated by the following equations:

(1) $\quad RX + 2M \rightarrow RM + MX$
(2) $\quad 2RX + 2M \rightarrow R-R + 2MX$ The latter reaction, known as the Wurtz-Fittig reaction, is a well recognized method of synthesizing organic compounds and has in the past been the subject of extensive experimental investigation.

Reactions between halogenated heterocyclic compounds and alkali metals have heretofore been noted and were found to follow the general Equation 1 set forth above. That is, the halogen atom attached to the heterocyclic ring was replaced by a metal atom to yield an organometallic compound.

It has now been discovered that halogenated thiophene compounds containing at least one alpha hydrogen atom, when reacted with sodium under particular conditions hereinafter described in detail, give rise to halogenated thienylsodium compounds. In other words, metallic sodium, instead of replacing the halogen atom on the thiophene ring as ordinarily would be expected, undergoes an unusual and unexpected substitution reaction with replacement of a hydrogen atom to yield a thiophene ring having as substituents attached thereto a halogen and a sodium atom. The resulting compound, having an electropositive and an electronegative group linked to the same thiophene ring is extremely useful as an intermediate in the synthesis of derivatives of thiophene which, in turn, find use in the manufacture of plastics, pharmaceuticals, insecticides, dyes, addition agents for petroleum fractions, odorants, synthetic lubricants, waxes, extreme pressure additives for mineral oils and anti-foaming agents. The halogenated thienylsodium compounds produced in accordance with the method of this invention may thus be subjected to sulfonation, carbonation, halogenation, acylation, alkylation, hydrogenation, nitration, etc., to yield useful derivatives of thiophene. The compounds may also be coupled or condensed with other molecules, be reacted with various other metals and, in general, undergo a multitude of reactions which will be recognized by those skilled in the art.

In accordance with the process of this invention, halogenated thienylsodium compounds are prepared by the interaction of sodium in the presence of mercury with a halogenated thiophene compound containing a hydrogen atom in at least one of the alpha positions, that is, a hydrogen atom attached to one of the carbon atoms adjacent to the sulfur atom in the thiophene ring. The compounds to be metalated by the method described herein will accordingly contain a hydrogen atom in either, or both, the 2 and 5 position of the thiophene ring. The halogen atom of the compound may occupy the remaining alpha position or may be substituted in either of the beta positions. The thiophene compound may also contain more than one halogen substituent which may either be the same or a different member of the halogen family. Also, the thiophene ring may have one or two of its nuclear hydrogen atoms replaced by alkyl radicals, it being essential, however, for purposes of the present invention, that the thiophene reactant contain at least one halogen substituent and at least one alpha hydrogen atom. The reaction contemplated by this invention may thus be designated by the following general equation:

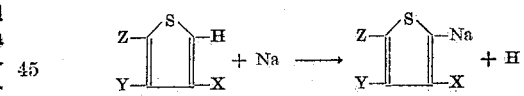

where at least one of the substituents X, Y, and Z is a halogen atom and the two remaining substituents are either alkyl radicals, hydrogen or halogen atoms. Thus, the present invention contemplates the metalation of compounds such as 2-chlorothiophene, 3-chlorothiophene, 2,3-dichlorothiophene, 3,4-dichlorothiophene, 2,4-dichlorothiophene, 2,3,4-trichlorothiophene, 2-bromothiophene, 3-bromothiophene, 2,3-dibromothiophene, 3,4-dibromothiophene, 2,4-dibromothiophene, 2,3,4 - tribromothiophene, 2 - iodothiophene, 3 - iodothiophene, 2,3 - di-iodothiophene, 2,4 - di-iodothiophene, 3,4 - di-iodothiophene, 2,3,4-tri-iodothiophene; 2-chloro, 3-bromothiophene; 3-chloro, 4-bromothiophene; 2-chloro, 4-bromothiophene; 2,3-dichloro, 4-bromothiophene; 2,4-dichloro, 3-bromothiophene; 2-chloro, 3-iodo, 4-bromothiophene; 2-bromo, 3-iodothiophene; 2 - chloro, 3 - iodothiophene; 2-chloro, 3-methylthiophene; 2-ethyl, 4-bromothiophene; 3-methyl, 4-iodothiophene; 2,3-dimethyl, 4-chlorothiophene; 2-bromo, 3-methyl, 4-ethylthiophene, etc.

It has been found that by carrying out the above reaction in an inert atmosphere and in the presence of an ethereal solvent, an acidic alpha hydrogen atom of the halogenated thiophene is replaced by a sodium atom to yield a new composition of matter, namely, a halothienylsodium. This discovery is described in greater detail in copending application Serial Number 718,271, filed December 24, 1946. Now, in accordance with the present invention, it has been found that the yield of halothienylsodium is substantially increased when the reaction is carried out in the presence of a small amount of mercury. The mercury present in the reaction mixture apparently acts in a catalytic manner to promote greater yields of the desired halothienylsodium compound.

It is essential in effecting metalation in accordance with the present invention that the reaction be carried out in the presence of an ethereal solvent in which the ratio of carbon to oxygen is not greater than about four to one. Thus, when the reaction was carried out under identical conditions, using an ethereal solvent having a carbon to oxygen ratio greater than the above or using an inert hydrocarbon solvent such as benzene, toluene, hexane and the like, the unexpected results obtained in accordance with the present method were not encountered.

The solvent to be employed herein in effecting metalation of the halogenated thiophene compound accordingly is an organic ether characterized by the presence of the linkage

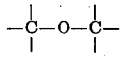

and containing not more than four carbon atoms per atom of oxygen. Suitable ethereal solvents which may be employed include diethyl ether, dimethyl ether, methyl ethyl ether, dimethyl ether of ethylene glycol, and the dimethyl ethers of polyethylene glycols. Of this group, the normally liquid compounds are to be preferred and, in particular, diethyl ether.

The unique metalation reaction of the present invention appears to be confined to the use of sodium as the metalating agent. Sodium may be introduced into the reaction mixture as metallic sodium, or in the form of an alloy containing sodium in substantial proportion, preferably as its major component. A particularly convenient method of introducing sodium into the reaction mixture in accordance with this invention is in the form of a sodium amalgam, the mercury of the amalgam apparently acting as a catalyst to give increased yields of desired product as compared with the use of sodium alone. The improved results of this invention can also be obtained by introducing sodium and mercury separately into the reaction mixture. If such a procedure is employed, it is preferable to use finely divided sodium such as sodium shot or sodium sand, since the reaction has been found to proceed with greater ease when sodium in a fine state of sub-division is employed. A convenient method of preparing finely divided sodium for use in the present invention comprised melting the sodium at the reflux temperature of anhydrous toluene in an atmosphere of nitrogen and then cooling rapidly with high speed stirring. The toluene was then replaced with the ethereal solvent employed, and the sodium particles so obtained were used in effecting metalation. Likewise, any other means of finely dividing the sodium metal may be employed.

As pointed out above, sodium will react with a halogenated thiophene even in the absence of mercury but the presence of small amounts of this element contributes to the ease of reaction and gives rise to increased yields of the desired halothienylsodium. Even minute amounts of mercury of the order of 0.01 gram atom per mole of halogenated thiophene being treated show an improvement in the amount of product obtained. As a general rule, amounts of mercury in excess of 0.25 gram atom per mole of halogenated thiophene will not be found to be necessary to obtain the optimum yields of desired halothienylsodium. It may thus be stated that the present invention contemplates the use of mercury in amounts of between about 0.01 gram atom and about 0.25 gram atom per mole of halogenated thiophene employed. Preferred amounts of mercury, either alone or combined with sodium in the form of an amalgam, lie between about 0.10 and about 0.25 gram atom per mole of halogenated thiophene.

Due to the high reactivity of sodium and the resultant halothienylsodium, it is essential to exclude moisture and air from the reaction zone and to carry out the process of this invention in an inert atmosphere, such as nitrogen or other of the inert gases. If the ethereal solvent employed is one of low boiling point, such as diethyl ether, the vapor of said solvent may provide the inert atmosphere under which the reaction takes place.

The temperature at which the reaction of sodium and halogenated thiophene compounds is carried out, in accordance with this invention, will generally be between about −10° C. and about 50° C. Usually at temperatures below −10° C. the reaction is sluggish so that little or no metalation takes place, while at temperatures above about 50° C. there is a tendency for the halogenated thiophene reactant to lose its halogen substituents, thus interfering with the desired course of the reaction. Also, at higher temperatures, as the melting point of sodium or sodium amalgam is approached, fusion occurs, drastically reducing the yield of desired product. The preferred temperature range appears to be between about 20° C. and about 40° C. The reaction may, if desired, be carried out under pressure, although ordinarily the process proceeds readily at atmospheric pressure. Usually when a pressure is employed, it will be sufficient to maintain the reactants in liquid phase, and this will be dependent on the particular temperature involved. It will, of course, be understood that these reaction variables are more or less interdependent.

The following detailed examples will serve to illustrate the method of metalating halogenated thiophenes in accordance with the present invention:

Example 1

A mixture of 118 grams (1 mole) of 2-chlorothiophene and 700 milliliters of anhydrous diethyl ether was added slowly at a reflux temperature of about 40° C., over a period of 2 hours, to 55 grams of sodium amalgam sand, containing 35 grams (1.5 gram atoms) of sodium and 25 grams (0.125 gram atom) of mercury, and 300 milliliters of anhydrous diethyl ether. After the addition was completed, the reaction mixture was refluxed for an additional 2 hours, after which it was cooled to 25° C. The product resulting from said reaction was identified as 5-chloro-2-thienylsodium. Such identification was effected by carbonating the reaction mixture with small pieces of freshly crushed Dry Ice. The temperature rose momentarily but was kept below 30° C. Unreacted sodium was destroyed with 100 milliliters of ethanol, and 350 milliliters of distilled water were then cautiously added. Acidification of the resulting aqueous layer with 175 milliliters of concentrated hydrochloric acid yielded 150 grams (92 per cent yield) of a product which was identified as 5-chloro-2-thiophenecarboxylic acid.

Example 2

A mixture of 177 grams (1.5 moles) of 2-chlorothiophene and 750 milliliters of anhydrous diethyl ether was added rapidly to freshly prepared sodium amalgam sand containing 35 grams (1.5 gram atoms) of sodium and 20 grams (0.10 gram atom) of mercury. The reaction became vigorous upon said addition and periodic cooling was required for about one hour. When the reaction had subsided, the mixture was warmed to a reflux temperature of about 40° C. for an additional 2 hours, after which it was cooled. The product resulting from said reaction was identified as 5-chloro-2-thienylsodium.

Such identification was effected by carbonating the product by the addition thereto of small pieces of freshly crushed Dry Ice, keeping the temperature below 30° C. until carbonation was completed. Six hundred milliliters of distilled water were then cautiously added. The resulting aqueous layer was separated and acidified with 170 milliliters of concentrated hydrochloric acid to yield 180 grams (74 per cent yield) of a product which was identified as 5-chloro-2-thiophenecarboxylic acid.

Example 3

A mixture of 236 grams (2 moles) of 2-chlorothiophene and 500 milliliters of anhydrous diethyl ether was added rapidly to freshly prepared sodium amalgam sand containing 50 grams (2.17 gram atoms) of sodium and 29 grams (0.145 gram atom) of mercury. The reaction became very vigorous upon said addition, with the temperature rising to about 45° C. The reaction mixture was periodically cooled to 40° C. for about one hour, after which the mixture was warmed to reflux for an additional 2 hours. The product resulting from said reaction was identified as 5-chloro-2-thienylsodium.

Such identification was effected, as in the previous example, by carbonating and acidifying to yield 212 grams (65 per cent yield) of a product which was identified as 5-chloro-2-thiophenecarboxylic acid.

Example 4

A mixture of 236 grams (2 moles) of 2-chlorothiophene and 200 milliliters of anhydrous diethyl ether was added rapidly to freshly prepared sodium amalgam sand containing 50 grams (2.17 gram atoms) of sodium and 29 grams (0.145 gram atom) of mercury. The reaction became very vigorous upon said addition, with the temperature rising to about 45° C. The reaction mixture was periodically cooled to 40° C. for about one hour, after which the mixture was warmed to reflux for an additional 2 hours. The product resulting from said reaction was identified as 5-chloro-2-thienylsodium.

Such identification was effected, as in the previous example, by carbonating and acidifying to yield 166 grams (50 per cent yield) of a product which was identified as 5-chloro-2-thiophenecarboxylic acid.

An examination of the yields of 5-chloro-2-thiophenecarboxylic acid obtained in Examples 1–4, where the reaction was carried out under substantially identical conditions, with the exception of the amount of ether employed, shows that the quantity of solvent present directly affects the yield of acid obtained which, in turn, is indicative of the amount of desired halothienylsodium compound obtained. This phenomenon will be readily apparent from the following table:

| Example | Ml. of Solvent per Mole of 2-chlorothiophene | Per cent Yield of 5-chloro-2-thiophenecarboxylic Acid |
|---|---|---|
| 1 | 1,000 | 92 |
| 2 | 500 | 74 |
| 3 | 250 | 65 |
| 4 | 100 | 50 |

It will be seen from an examination of the above data that the yield of 5-chloro-2-thiophenecarboxylic acid rapidly increases as the quantity of ether is increased. Accordingly, the quantity of solvent used in the present process will generally be greater than about 200 milliliters per mole of halogenated thiophene and usually will be between about 200 and 1500 milliliters per mole of halogenated thiophene.

To show the increased yields of product obtained by the presence of mercury in the reaction mixture, an example was carried out similar to Example 1 but without mercury, as illustrated by the following:

Example 5

A mixture of 118 grams (1 mole) of 2-chlorothiophene and 700 milliliters of anhydrous diethyl ether was slowly added, at a reflux temperature of about 40° C. over a period of 4 hours, to 35 grams (1.5 gram atom) of freshly prepared sodium shot and 300 milliliters of anhydrous diethyl ether. The surfaces of the sodium shot darkened immediately and in a short time the ether solution acquired a grayish cast. After the addition was completed, the reaction mixture was refluxed for an additional 2 hours, after which it was cooled to 25° C. The product resulting from said reaction was identified as 5-chloro, 2-thienylsodium.

Such identification was effected by carbonating the product by the addition thereto of freshly crushed Dry Ice. The temperature rose as the carbonation proceeded but was kept below 30° C. The temperature fell rapidly when carbonation was completed. One hundred milliliters of ethanol were then added to destroy the unreacted sodium, after which 350 milliliters of distilled water were cautiously added. The aqueous solution was separated and acidified with 230 milliliters of concentrated hydrochloric acid to yield 115 grams (70 per cent yield) of a product which was identified as 5-chloro, 2-thiophenecarboxylic acid.

It will thus be seen that the yield of 5-chloro-2-thiophenecarboxylic acid, and consequently the yield of 2-chlorothienylsodium, was substantially increased by the presence of a small amount of mercury, other conditions remaining constant.

This invention likewise contemplates improvement in the yields of other halogenated thiophenes by the addition of a small proportion of mercury to the reaction mixture. Thus, other halogenated thiophenes undergo the unique reaction with sodium under the conditions set forth above, as will be seen from the following:

*Example 6*

A mixture of 41 grams (0.25 mole) of 2-bromothiophene and 200 milliliters of anhydrous diethyl ether was slowly added, at a reflux temperature of about 40° C. over a period of about 2 hours, to 13.5 grams (0.59 gram atom) of freshly prepared sodium shot and 100 milliliters of anhydrous diethyl ether. The reaction was carried out in an atmosphere of nitrogen. The surfaces of the sodium darkened immediately and the ether solution acquired a gray-black cast. After the addition was completed, the reaction mixture was refluxed for an additional hour, after which it was cooled to 25° C. The product resulting from said reaction was identified as 5-bromo, 2-thienylsodium.

Said identification was effected by carbonating the product by the addition thereto of freshly crushed Dry Ice. The temperature rose rapidly but was kept below 30° C. The completion of the carbonation was noted by the sudden drop in temperature. Fifty milliliters of ethanol were added to destroy unreacted sodium and then 200 milliliters of distilled water were cautiously added. The aqueous layer was separated and acidified with 70 milliliters of concentrated hydrochloric acid. A red oil separated and crystallized, on cooling, to give 18 grams (35 per cent yield) of crude 5-bromo, 2-thiophenecarboxylic acid. White needle-like crystals were obtained by sublimation of the crude product. The crystals so obtained had a melting point of 134.5–135.5° C. and a neutral equivalent of 202. The calculated neutral equivalent for 5-bromo, 2-thiophenecarboxylic acid was 207.

*Example 7*

A mixture of 55 grams (0.25 mole) of 2-iodothiophene and 200 milliliters of anhydrous diethyl ether was slowly added, at a reflux temperature of about 40° C. over a period of 45 minutes, to 9 grams (0.38 gram atom) of freshly prepared sodium shot. The solution acquired a bluish color which became more predominant as the reactiton proceeded. After the addition was completed, the reaction mixture was refluxed for an additional 1¾ hours and then cooled to 20° C. with an ice bath. The product resulting from said reaction was identified as 5-iodo, 2-thienylsodium.

Said identification was effected by carbonating the product by the addition thereto of freshly crushed Dry Ice. The temperature rose momentarily but was kept below 30° C. Thirty milliliters of ethanol were slowly added to destroy the unreacted sodium and then 200 milliliters of distilled water were added cautiously. The resultant aqueous layer was separated and acidified with 50 milliliters of concentrated hydrochloric acid. A red oil separated from the solution and crystallized, on cooling, to yield 21 grams (33 per cent yield) of crude 5-iodo, 2-thiophenecarboxylic acid. White needle-like crystals were obtained when the crude product was sublimed. These crystals had a melting point of 132.5–133.5° C. and a neutral equivalent of 250. The calculated neutral equivalent for 5-iodo, 2-thiophenecarboxylic acid was 253.

We claim:

1. A method for metalating a thiophene compound having the general formula:

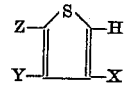

where at least one of the substituents X, Y, and Z is a halogen atom and the two remaining substituents are selected from the group consisting of alkyl, hydrogen, and halogen substituents, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, a halothienylsodium.

2. A method for metalating a thiophene compound having the general formula:

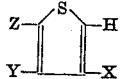

where at least one of the substituents X, Y, and Z is a halogen atom and the two remaining substituents are selected from the group consisting of alkyl, hydrogen, and halogen substituents, which comprises contacting said compound with sodium in the presence of a small amount of mercury and an ether, said ether having a carbon to oxygen ratio not greater than 4 to 1, maintaining the resulting reaction mixture under an inert atmosphere and at a temperature between about −10° C. and about 50° C., thereby effecting replacement of a nuclear hydrogen atom of said compound with sodium to yield, as the resulting product, a halothienylsodium.

3. A method for metalating a thiophene compound having the general formula:

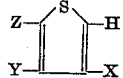

where at least one of the substituents X, Y and Z is a halogen atom and the two remaining substituents are selected from the group consisting of alkyl, hydrogen, and halogen substituents, which comprises contacting said compound with sodium in the presence of a small amount of mercury and an ether, said ether having a carbon to oxygen ratio not greater than 4 to 1, maintaining the resulting reaction mixture under an inert atmosphere and at a temperature between about 20° C. and about 40° C., thereby effecting replacement of a nuclear hydrogen atom of said compound with sodium to yield, as the resulting product, a halothienylsodium.

4. A method for metalating a thiophene compound having the general formula:

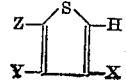

where at least one of the substituents X, Y, and Z is a halogen atom and the two remaining substituents are selected from the group consisting of alkyl, hydrogen, and halogen substituents, which comprises contacting said compound with sodium in the presence of a small amount of mercury and diethyl ether, maintaining the resulting reaction mixture under an inert atmosphere, thereby effecting replacement of a nuclear hydrogen atom of said compound with sodium to yield, as the resulting product, a halothienylsodium.

5. A method for metalating a thiophene compound having the general formula:

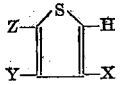

where at least one of the substituents X, Y, and Z is a halogen atom and the two remaining substituents are selected from the group consisting of alkyl, hydrogen, and halogen substituents, which comprises contacting said compound with sodium in the presence of a small amount of mercury and diethyl ether, maintaining the resulting reaction mixture under an inert atmosphere and at a temperature between about 20° C. and about 40° C., thereby effecting replacement of a nuclear hydrogen atom of said compound with sodium to yield, as the resulting product, a halothienylsodium.

6. A method for metalating a thiophene compound having the general formula:

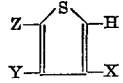

where at least one of the substituents X, Y, and Z is a halogen atom and the two remaining substituents are selected from the group consisting of alkyl, hydrogen, and halogen substituents, which comprises contacting said compound with sodium amalgam in the presence of at least 200 milliliters of an ether per mole of said compound, said ether having a carbon to oxygen ratio not greater than 4 to 1, maintaining the resulting reaction mixture under an inert atmosphere and at a temperature between about −10° C. and about 50° C., thereby effecting replacement of a nuclear hydrogen atom of said compound with sodium to yield, as the resulting product, a halothienylsodium.

7. A method for metalating a thiophene containing at least one alpha hydrogen atom and having at least one of the other nuclear hydrogen atoms replaced by halogen, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, a halothienylsodium.

8. A method for metalating a thiophene containing at least one alpha hydrogen atom and having at least one of the other nuclear hydrogen atoms replaced by chlorine, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, a chlorothienylsodium.

9. A method for metalating a thiophene containing at least one alpha hydrogen atom and having at least one of the other nuclear hydrogen atoms replaced by iodine, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, an iodothienylsodium.

10. A method for metalating a thiophene containing at least one alpha hydrogen atom and having at least one of the other nuclear hydrogen atoms replaced by bromine, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, a bromothienylsodium.

11. A method for metalating a monochlorothiophene containing at least one alpha hydrogen atom, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting the replacement of a nuclear hydrogen atom of said compound with sodium to yield, as the resulting product, a halothienylsodium.

12. A method for metalating monochlorothiophene, which comprises contacting said compound with sodium in the presence of a small amount of mercury and an ether, said ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, chlorothienylsodium.

13. A method for metalating a monochlorothiophene containing at least one alpha hydrogen atom, which comprises contacting said compound with sodium in the presence of a small amount of mercury and an ether, said ether having a carbon to oxygen ratio not greater than 4 to 1, maintaining the resulting reaction mixture under an inert atmosphere and at a temperature between about −10° C. and about 50° C., thereby effecting replacement of a nuclear hydrogen atom of said compound with sodium to yield, as the resulting product, a halothienylsodium.

14. A method for metalating monochlorothiophene containing at least one alpha hydrogen atom, which comprises contacting said compound with sodium in the presence of a small amount of mercury and an ether, said ether having a carbon to oxygen ratio not greater than 4 to 1, maintaining the resulting reaction mixture under an inert atmosphere and at a temperature between about 20° C. and about 40° C., thereby effecting replacement of a nuclear hydrogen atom of said compound with sodium to yield, as the resulting product, a halothienylsodium.

15. A method for metalating monochlorothiophene containing at least one alpha hydrogen atom, which comprises contacting said compound with sodium amalgam in the presence of an ether, said ether having a carbon to oxygen ratio not greater than 4 to 1, maintaining the resulting reaction mixture under an inert atmosphere and at a temperature between about −10° C. and about 50° C., thereby effecting replacement of a nuclear hydrogen atom of said compound with sodium amalgam to yield, as the resulting product, a halothienylsodium.

16. A method for metalating a thiophene compound containing at least one alpha hydrogen atom and having at least one of the other nuclear hydrogen atoms replaced by halogen, which comprises contacting said compound with sodium and between about 0.01 and about 0.25 gram atom of mercury per mole of said compound in the presence of an ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, a halothienylsodium.

17. A method for metalating a thiophene compound containing at least one alpha hydrogen atom and having at least one of the other nuclear hydrogen atoms replaced by halogen, which comprises contacting said compound with sodium and between about 0.10 and about 0.25 gram atom of mercury per mole of said compound in the presence of an ether having a carbon to oxygen ratio not greater than 4 to 1, maintaining the resulting reaction mixture under an inert atmosphere, thereby effecting replacement of a nuclear hydrogen atom of said compound with sodium to yield, as the resulting product, a halothienylsodium.

JOHN W. SCHICK.
HOWARD D. HARTOUGH.

REFERENCES CITED

The following references are of record in the file of this patent:

Chemical Abstracts, 34, 6603-2 (1940); 36, 5802-5 (1942); 39, 3267-7 (1945).